(12) United States Patent
Mack

(10) Patent No.: US 8,215,649 B2
(45) Date of Patent: Jul. 10, 2012

(54) DRILL CHUCK

(75) Inventor: Hans-Dieter Mack, Sontheim (DE)

(73) Assignee: ROEHM GmbH, Sontheim (DE)

( * ) Notice: Subject to any disclaimer, the term of this patent is extended or adjusted under 35 U.S.C. 154(b) by 358 days.

(21) Appl. No.: 11/988,266

(22) PCT Filed: Dec. 23, 2006

(86) PCT No.: PCT/DE2006/002313
§ 371 (c)(1),
(2), (4) Date: Jan. 3, 2008

(87) PCT Pub. No.: WO2008/077362
PCT Pub. Date: Jul. 3, 2008

(65) Prior Publication Data
US 2010/0127464 A1    May 27, 2010

(51) Int. Cl.
*B23B 31/165* (2006.01)
(52) U.S. Cl. ............ 279/62; 279/125; 279/140
(58) Field of Classification Search .......... 279/60, 279/61, 62, 63, 64, 140, 125, 902
See application file for complete search history.

(56) References Cited

U.S. PATENT DOCUMENTS

| | | | | |
|---|---|---|---|---|
| 5,435,578 | A * | 7/1995 | Rohm | 279/62 |
| 5,499,829 | A * | 3/1996 | Rohm | 279/62 |
| 5,741,016 | A | 4/1998 | Barton | |
| 5,765,839 | A * | 6/1998 | Rohm | 279/62 |
| 6,517,088 | B1 * | 2/2003 | Rohm | 279/62 |
| 6,550,785 | B2 * | 4/2003 | Rohm | 279/62 |
| 6,659,474 | B2 * | 12/2003 | Sakamaki et al. | 279/62 |
| 2002/0000698 | A1 * | 1/2002 | Rohm | 279/62 |
| 2005/0023775 | A1 * | 2/2005 | Yang et al. | 279/62 |
| 2006/0208433 | A1 * | 9/2006 | Cachod | 279/63 |
| 2006/0244224 | A1 * | 11/2006 | Zhou et al. | 279/62 |

FOREIGN PATENT DOCUMENTS

| | | |
|---|---|---|
| EP | 0 710 518 | 5/1996 |
| EP | 1 314 499 | 5/2003 |

* cited by examiner

*Primary Examiner* — Daniel Howell
*Assistant Examiner* — Paul M Janeski
(74) *Attorney, Agent, or Firm* — Andrew Wilford

(57) ABSTRACT

The invention relates to a drill chuck with a chuck body (1) that can be connected to a drill spindle and in which jaws (3) are arranged that engage into the screwthread of a rotatably guided threaded ring (6), furthermore with a locking mechanism for the threaded ring (6) consisting of a coaxial annular array of locking recesses (9) and of at least one locking member (10) that is engaged in the locking position under the force of a locking spring in the locking recesses (9). The drill chuck furthermore comprises a coaxial tightening ring (15) that can rotate between first abutments (16) in a limited manner opposite the threaded ring (6) and comprises a latch (17) forming two latching positions (18) for the tightening ring (15) in the circumferential direction. A locking ring (21) that can rotate with end stops (19) between second abutments (20, 20') of the tightening ring (15) in a limited manner is provided for adjusting the locking member (10) between the locking position and the release position corresponding to the position of the locking member (10) disengaged from the locking recesses (9), and the second abutment (20'), that is the front one in the direction of rotation (12) corresponding to the opening of the drill chuck, rests in the locking position on the end stop (19). The latch (17) is formed between the locking ring (21) and the threaded ring (6).

10 Claims, 7 Drawing Sheets

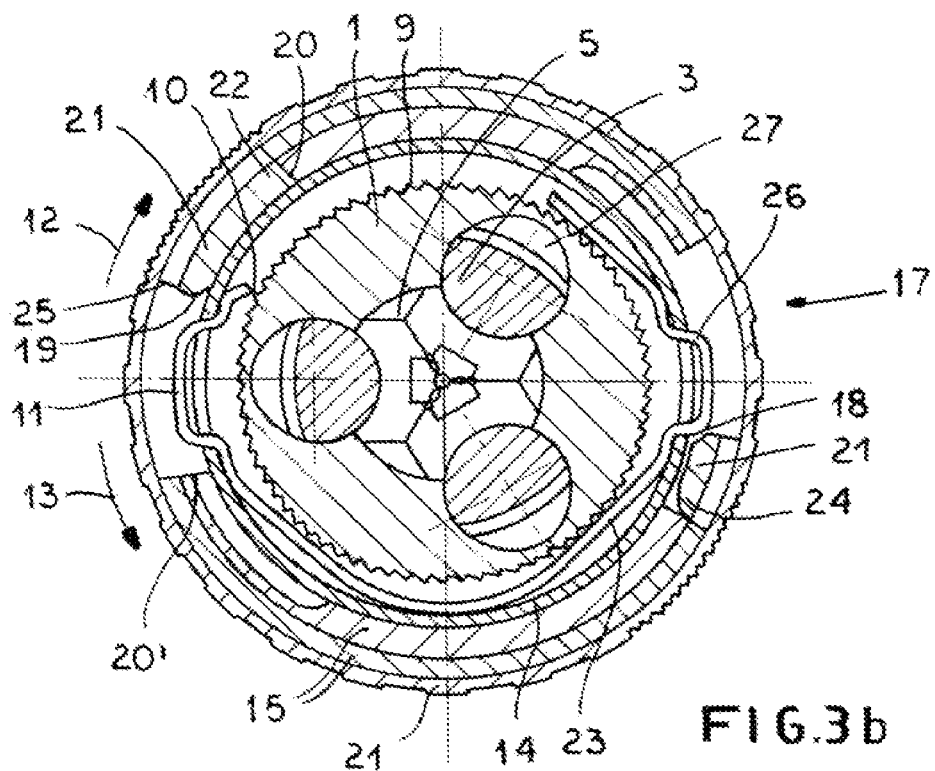
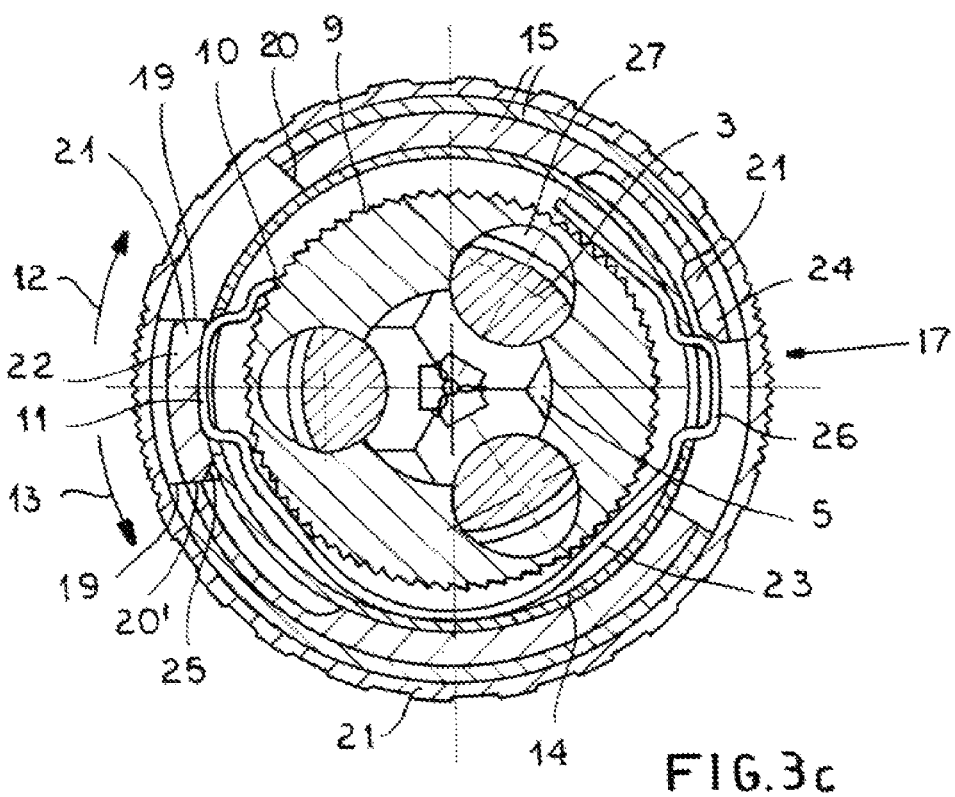

DRILL CHUCK

CROSS REFERENCE TO RELATED APPLICATIONS

This application is the US national phase of PCT application PCT/DE2006/002313, filed 23 Dec. 2006.

FIELD OF THE INVENTION

The invention relates to a drill chuck, especially for hammer drilling.

BACKGROUND OF THE INVENTION

A standard hammer-drill chuck has a chuck body that can be connected to a drill spindle and in which jaws forming a seat between themselves for the drilling tool are arranged in guide grooves running at an angle to the chuck axis, the jaws engaging with a row of teeth for opening and closing the drill chuck into the screwthread of a threaded ring rotatably guided on the chuck body, furthermore with a locking mechanism for the threaded ring consisting of a coaxial annular array of locking recesses and of least one locking member that is engaged in the locking position under the force of a locking spring in the locking recesses, locking member and the locking recesses engaging each other with inclined flanks in such a manner that they block the threaded ring against rotation in the direction of rotation corresponding to the opening of the drill chuck but when the threaded ring is rotated in the opposite direction of rotation, that is, the one corresponding to the closing of the drill chuck they press the locking member against the force of the locking spring out of the locking recesses and thus allow it to slide from locking recess to locking recess, furthermore with a coaxial tightening ring that can rotate between first abutments in a limited manner opposite the threaded ring, and with a latch forming two angularly offset latching positions for the tightening ring or sleeve.

Such a drill chuck is known from EP 0 710 518 A2 that has proven itself excellent in practice and has been sold in large numbers on account of its robustness and reliability. These previously cited advantages are associated with a very simple operation for the user since the locking mechanism is automatically actuated when loosening and tightening the drill chuck, that is, the user only has to grasp the tightening ring and rotate it in the one direction or the other. Reliable clamping of the drill tool is assured by the locking mechanism during drilling under high load, especially during hammer drilling, even if strong vibrations act on the drill chuck. However, it should be noted that drill chucks are is increasingly also used for driving screws with battery-operated drills that are not connected to the line voltage. When driving screws the load on the drill chuck is distinctly reduced and the use of a locking mechanism is not obligatory. Since when chucking a tool, e.g. a screw bit, at first the jaws come to rest on the tool shaft and the locking mechanism is actuated with engagement of the locking member into the locking recess due to the increase of the resistance to rotation that then occurs, the locking member proceeds by degrees over the locking recesses until reaching the desired tightening force. This is associated with wear of the locking recesses as well as of the locking member that is unnecessary when using the drill chuck for driving screws.

OBJECT OF THE INVENTION

The invention is therefore based on the problem of developing a drill chuck of the above-described type in such a manner that it is left to the user whether the locking mechanism is actuated or not while still having simple operation and insuring the simplest possible design.

SUMMARY OF THE INVENTION

The invention solves this problem for a drill chuck of the above-described type in that a locking ring that can rotate with end stops between second abutments of the tightening ring or sleeve in a limited manner is provided for moving the locking member between the locking position and the release position corresponding to the state of the locking member disengaged from the locking teeth, that the second abutment, which is forward in the direction of rotation corresponding to the opening of the drill chuck, rests in the locking position on the end stop, and that the latch mechanism is formed between the locking ring and the threaded ring.

Such a drill chuck is associated with the advantage that the user can actuate it in a customary manner, during which it makes no difference in particular when opening the drill chuck whether the locking mechanism is actuated or not. Thus, the user can produce the desired tightening force when chucking a tool by the tightening ring and can then decide, depending on the application, whether the locking ring is also to be rotated in the same direction of rotation in which the tightening ring had previously been rotated in order to actuate the locking mechanism. If the locking mechanism is actuated, the second abutment, that is the forward one in the direction of rotation corresponding to the opening of the drill chuck, rests in the locking position on the end stop, so that in order to open the drill chuck the tightening ring can be simply grasped and moved in the direction of rotation corresponding to opening without the locking ring having to be actuated again. Therefore, when the drill chuck is opened the locking ring is rotated relative to the locking member and the threaded ring until the latching position of the latch has been changed, so that the locking member is moved out of the locking recesses and when the rotation of the tightening ring is continued a joint rotation of the tightening ring, the locking ring and of the threaded ring with the locking member takes place relative to the chuck body, so that the jaws are displaced and the drill chuck opens. The mounting of the latch or at least a part of it on the locking ring simplifies the structure and the formation of the other components, especially of the tightening ring, so that it does not have to be specially shaped on its inner surface.

It is pointed out that in the case of the drill chuck according to EP 0 710 581 A2 known from the state of the art the tightening ring can rotate in a limited manner relative to the threaded ring in order to adjust the locking member between the locking position and the release position, and that the latch serves to secure the two positions of rotation of the tightening ring relative to the threaded ring. In the case of the drill chuck in accordance with the invention the tightening ring can also assume two positions of rotation relative to the threaded ring; however, this is not associated with the switching of the locking member if the latter remains permanently in the release position on account of no actuation of the locking ring. If the locking ring is rotated in order to actuate the locking mechanism the second abutments are switched. However, in order to open the drill chuck the second abutments do not have to be switched again since relative rotation of the tightening ring relative to the threaded ring remains possible and the locking ring is entrained. The latch thus ensures in cooperation with the first abutments an entrainment function for the locking ring when the locking mechanism is actuated by setting the position of rotation of the tightening ring.

It has proven to be especially favorable if the locking ring is rotatably supported on the tightening ring since this offers advantages during assembly as well as during actuation because direct access of the locking ring to the chuck body is not necessary for seating. The locking ring is preferably mounted on one of the two axial ends of the tightening ring in order to provide a large grip surface for the user on it.

It is preferable if the locking ring is supported radially on the outside of the tightening ring and the end stops are arranged on a locking cam formed on the inner periphery of the locking ring. In this embodiment an attractive appearance of the drill chuck can be retained in which no structures of the locking ring hinder gripping the tightening ring.

Alternately, there is also the possibility that the locking ring is guided radially inward relative to the tightening ring and extends through the latter at a ring window with a gripping cam that makes the end stops accessible. This embodiment provides an enlarged grip surface available that extends longer axially in the tightening ring and that is interrupted only for the ring window. It is more comfortable for the user if the gripping cam and the ring window are provided in duplicate diametrically opposite each other.

Furthermore, it is provided within the scope of the invention that a control edge is provided on the cam for controlling the locking member. When the locking ring is rotated relative to the tightening ring in the closing direction the locking member is moved out of the disengaged position into the engaged position and vice versa.

It is furthermore advantageous if the locking member is arranged in a rotationally fixed manner in an intermediate sleeve connected in a rotationally fixed manner to the threaded ring and is formed on a spring clip that also carries the latch member of the latch since the arrangement of both the locking member and the latch member in the spring clip simultaneously produces the desired increased spring tension in the locking position.

The different latching positions can be achieved in a simple manner in that the locking ring carries on its inner surface a latch cam that separates the two locking positions of the latch.

BRIEF DESCRIPTION OF THE DRAWING

The invention is explained in detail in the following using illustrated embodiment shown in the drawings.

FIG. 3b shows section of FIG. 1 in the tightened, unlocked position of the drill chuck, FIG. 3c shows section of FIG. 1 in the tightened, locked position of the drill chuck.

DETAILED DESCRIPTION

Figure 1:
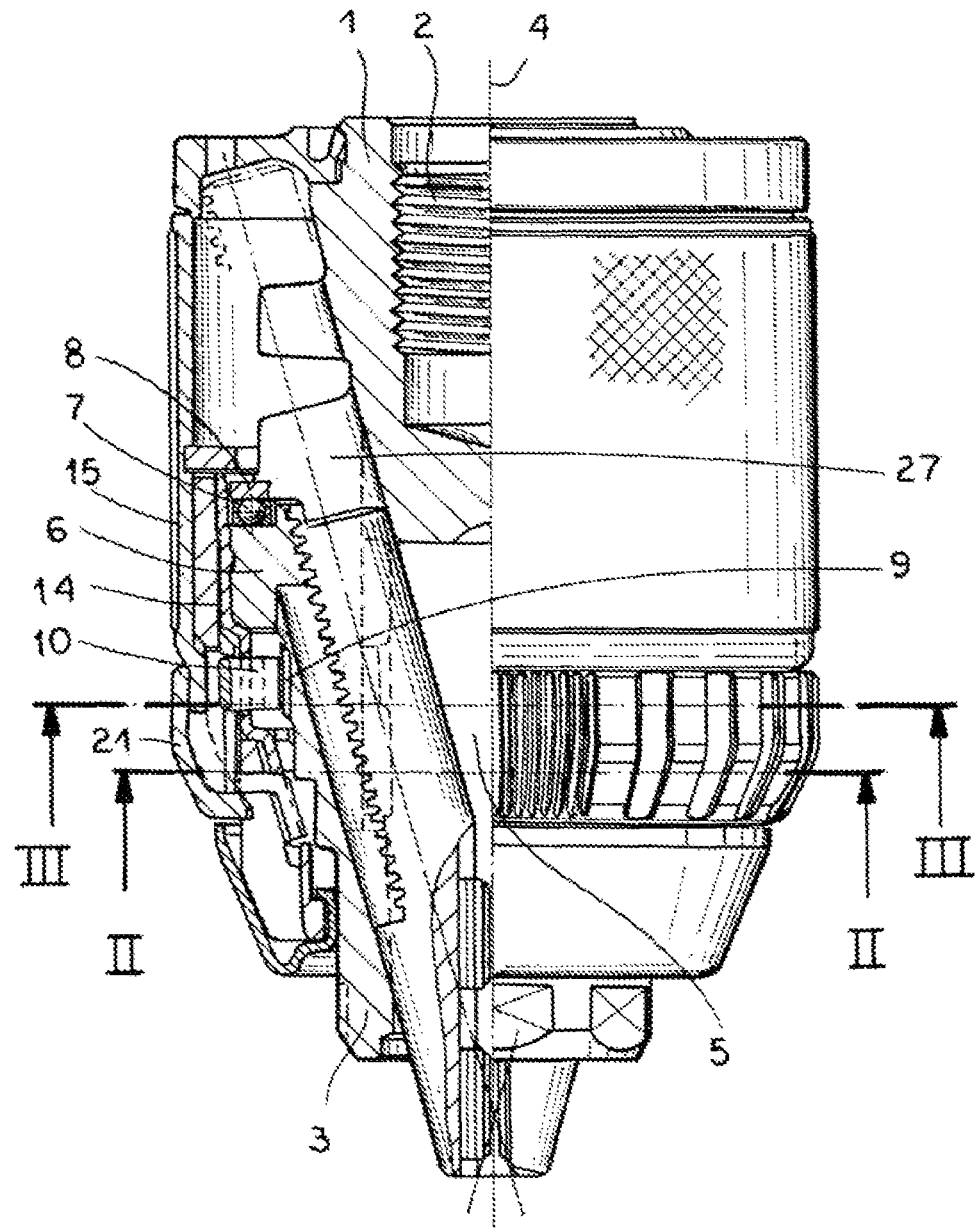
FIG. 1 shows a drill chuck of a first embodiment on the left in axial section and on the right in side view each showing the position of the jaws at the smallest tightening diameter and the nonlocking chuck position.

The drill chucks shown in the drawings serve to hold a tool (not shown) and comprise a chuck body 1 for connection to a drill spindle (also not shown). In order to connect to a drill drive spindle the chuck body 1 has a threaded bore 2. Drill chucks 1 furthermore comprise jaws 3 that center the tool, are axially guided and/or axially tightening and can be adjusted relative to a drill axis 4 in respective tool seats 5 coaxial to a drill axis 4. A tightening ring or sleeve 15 connected to a threaded ring 6 serves for this adjustment. The threaded ring 6 is rotatable on the chuck body 1 and is axially braced rearwardly via a ball bearing 7 and a pressure ring 8 on the chuck body 1. In order to prevent undesired movement of the jaws 3, the angular position of the threaded ring 6 can be fixed, to which end the locking ring 6 and the chuck body 1 form a locking device that consists of a coaxial annular array of locking recesses 9 and of a locking member 10, and one part of the locking device is associated with the chuck body 1 and the other part with the threaded ring 6, in the illustrated embodiments shown in the drawings the locking recesses 9 with the chuck body 1 and the locking member 10 with the threaded ring 6. In the locking position the locking member 10 is biased by a locking spring 11 into the locking recesses 9, so the locking member 10 and the recesses 9 ratchet on each other via flanks inclined in such a manner that they lock the threaded ring 6 against rotation in the direction of rotation corresponding to the opening of the drill chuck (arrow 12), but when the threaded ring 6 is rotated with a sufficiently large torque in the opposite direction of rotation (arrow 13), that is, corresponding to the closing of the drill chuck, they press the locking member 10 back against the spring force out of the locking recesses 9 and allow it to slide from locking recess 9 to locking recess 9 along the circumference of the chuck body 1.

Figure 5A:
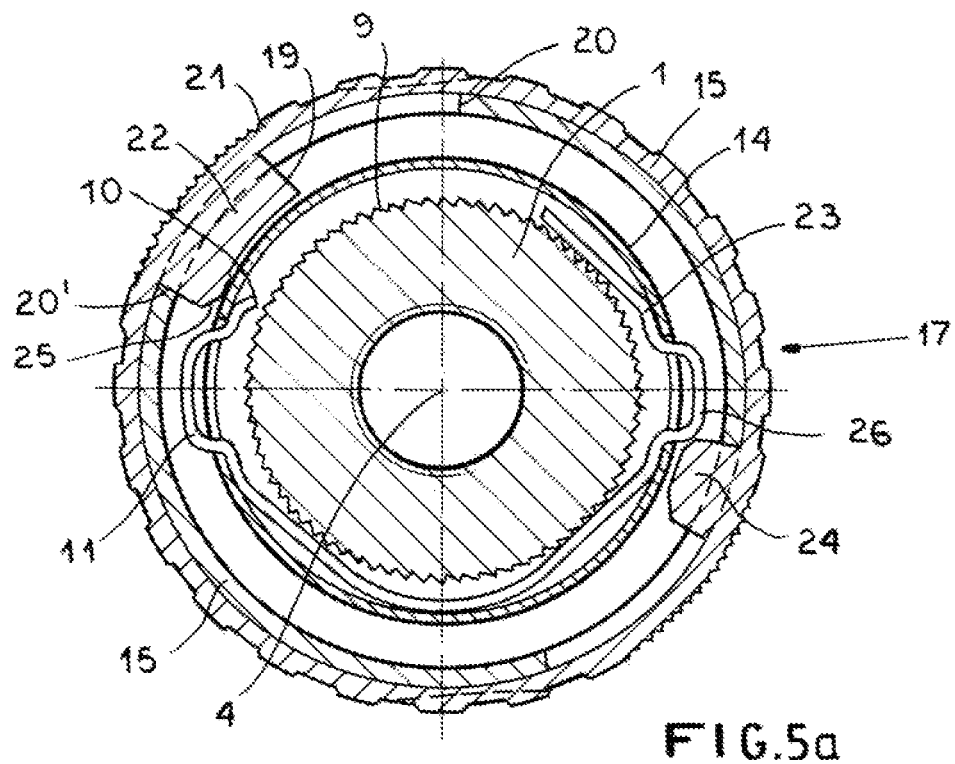
FIG. 5a shows section V-V in FIG. 4 in the tightening position corresponding to FIG. 3a, FIG. 5b shows section V-V in FIG. 4 in the tightening position corresponding to FIG. 3b.
Figure 5B:
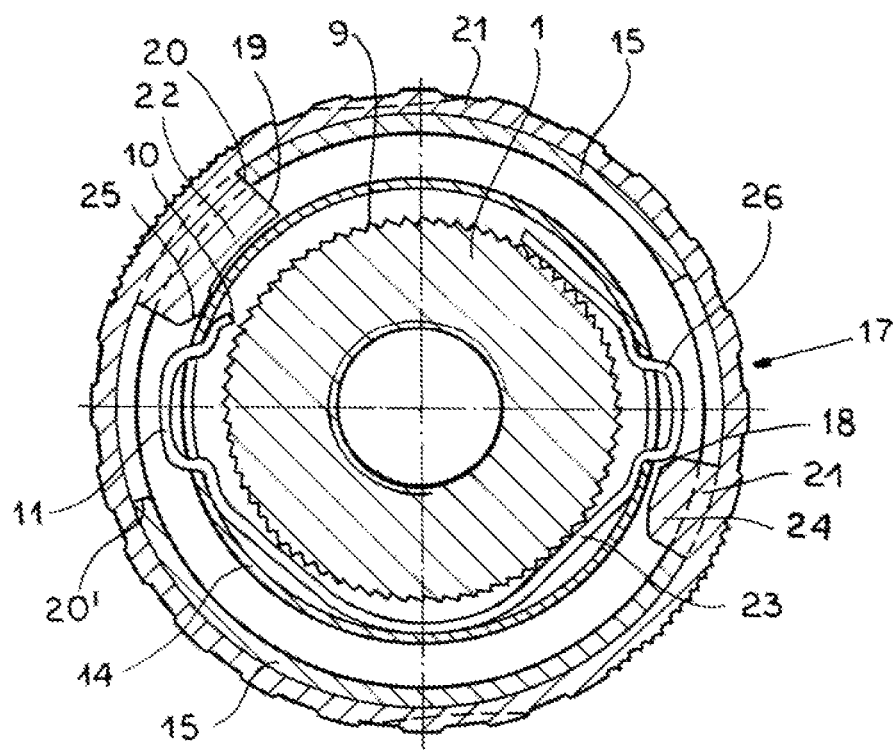
FIG. 5c shows section V-V in FIG. 4 in the tightening position corresponding to FIG. 3c.
Figure 5C:
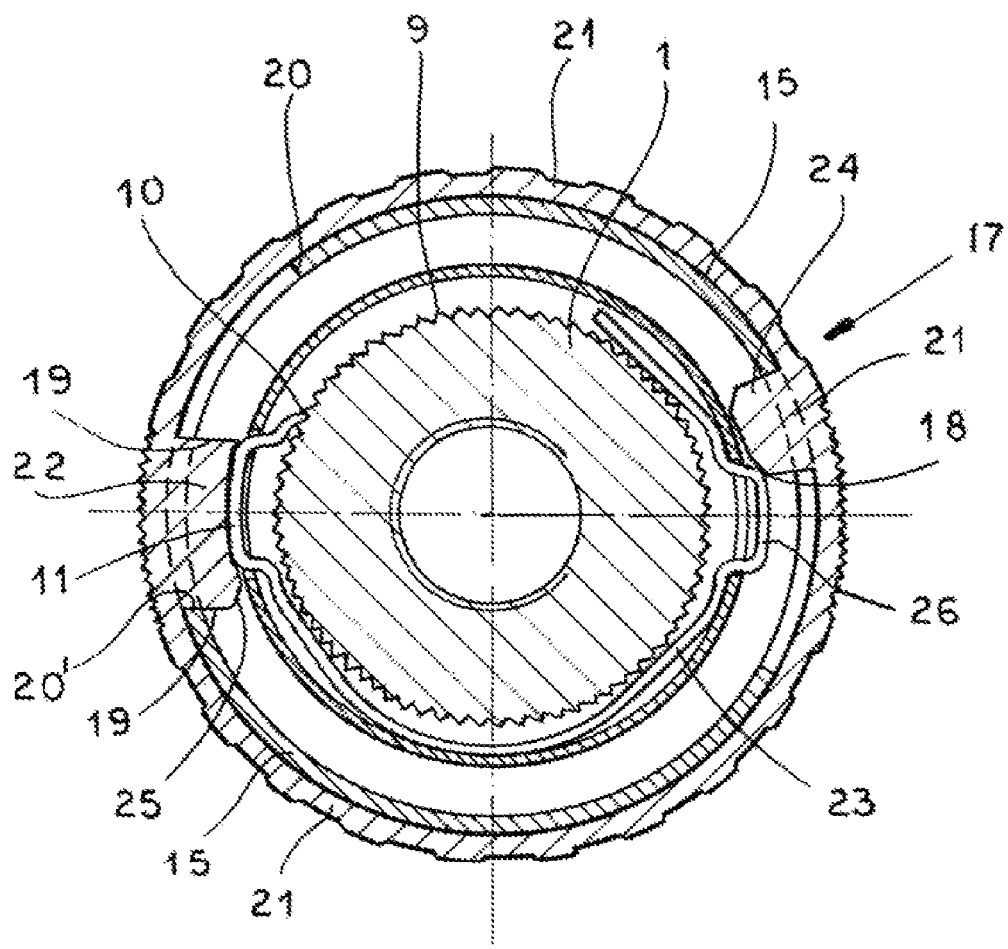

The locking member 10 is rotationally fixed in an intermediate sleeve 14 rotationally fixed to the threaded ring 6, that is, it itself is rotationally fixed to the threaded ring 6, and the position of rotation of the tightening ring 15 can be adjusted relative to the threaded ring 6 with the intermediate sleeve 14 and the locking member 10 between two first abutments 16. A latch mechanism 17 with two angularly spaced latching positions 18 for a latch member 26 serves to secure these two positions of rotation of the tightening ring 15 relative to the locking ring 6. The locking member 10 can be moved between its position engaged in the locking recesses 9 in the locking position and its disengaged position in the release position, to which end a locking ring 21 is provided that can rotate in a manner limited angularly by end stops 19 between two abutments 20 and 20' of the tightening ring, the locking ring resting in the direction of rotation 12 corresponding to the opening of the drill chuck with its end stop 19 on the front second abutment 20' of the locking ring 21 in the locking position (FIG. 5). Between the locking ring 21 and the threaded ring 6 that forms with the latch mechanism 17 the intermediate sleeve 14 connected in a rotationally fixed manner to the locking ring 6 and with the spring clip 23 the locking ring 21 carries a latch cam 24 on its inner surface that defines the latching positions 18.

Figure 4:
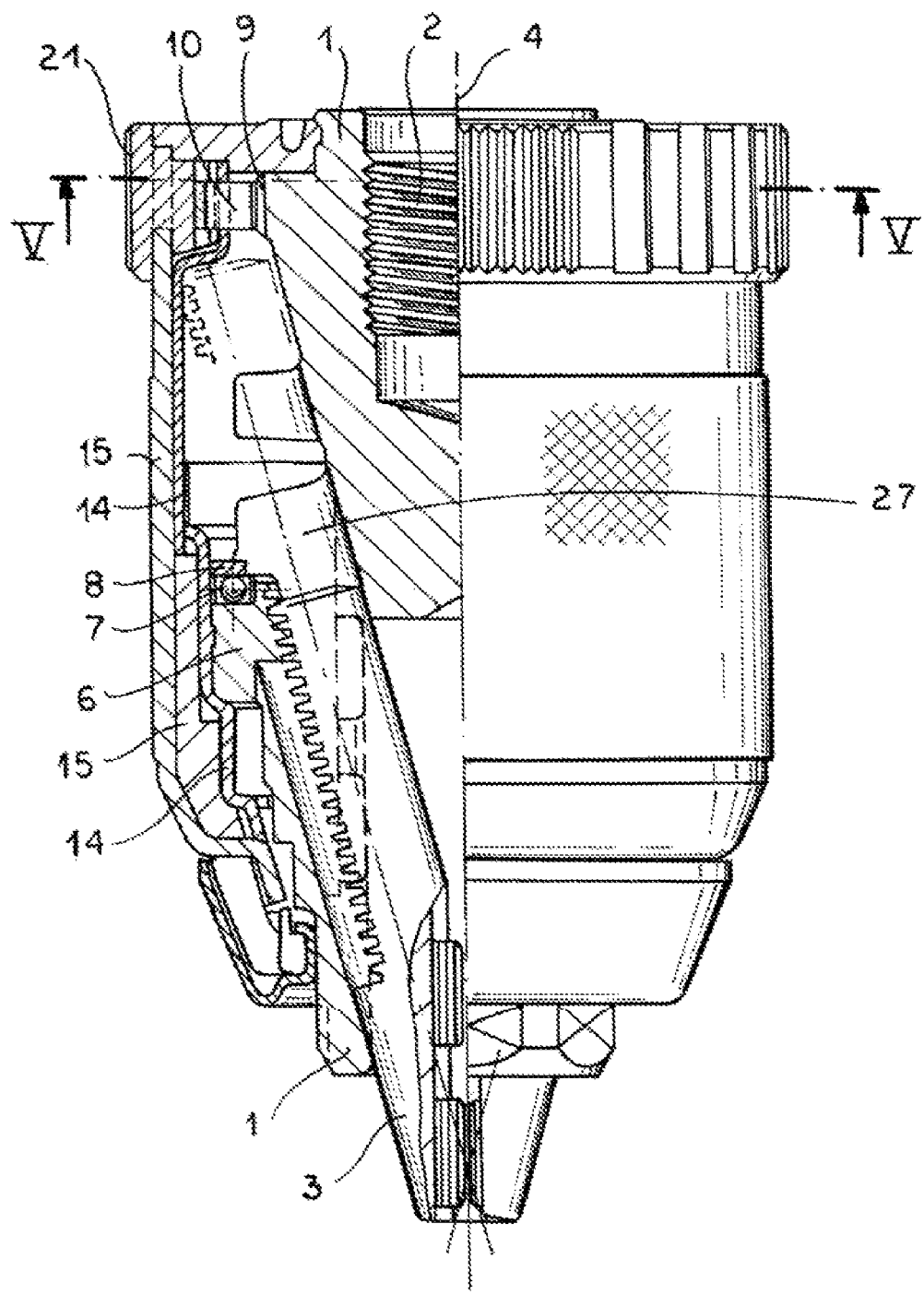
FIG. 4 shows a view a corresponding to FIG. 1 of a second embodiment with an with axially rear locking ring.

FIGS. 1 and 4 show that the locking ring 21 is rotatably supported on the tightening ring 15, namely, on the radial outer surface of the tightening ring 15 and that end stops 19 are provided on a locking cam 22 formed on the inner periphery of the locking ring 21. However, it is also conceivable to make the drill chuck in accordance with the invention such that the locking ring 21 is radially guided on an inside surface of the tightening ring 15 and extends through the latter in a ring window with a gripping cam that gives access to end stops 19, gripping cam as well as the ring window being provided in duplicate at diametrically opposite locations.

In order to control the locking member 10 a control edge 25 is formed on the cam 22. Rotation of the locking ring 21 relative to the tightening ring 15 into its closing direction 13 moves the locking member 10 out of the disengaged position into the engaged position and vice versa.

The basic design and method of operation of this drill chuck are known from EP 0 710 518 A2 and are understandable to the person skilled in the art so that in the following during the explanation of the method of operation of the drill chucks shown in the drawings only the differences resulting from the invention are referred to.

Figure 2A:
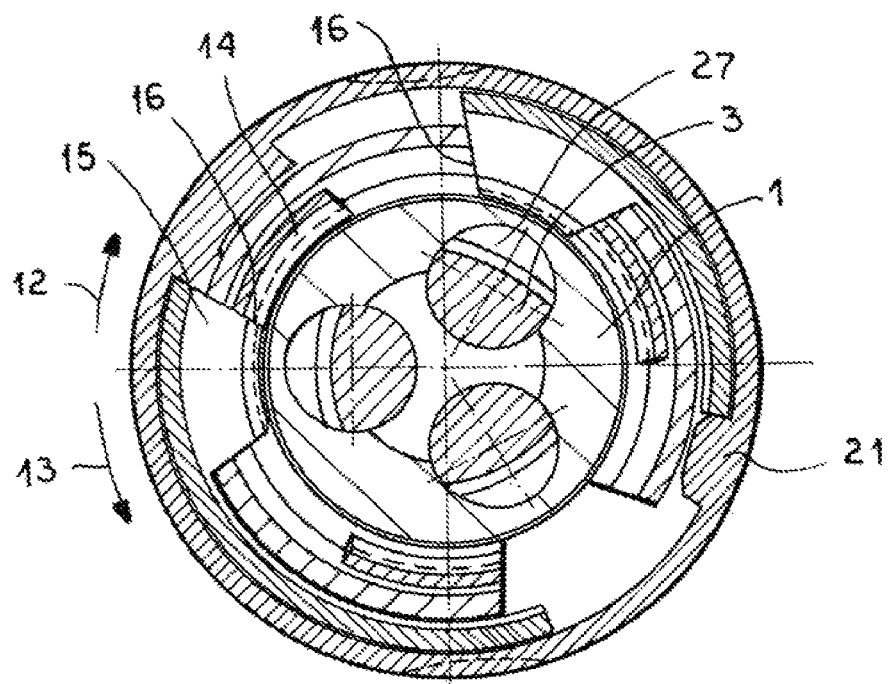
FIG. 2a shows section II-II of FIG. 1 in the open, unlocked position of the drill chuck.
Figure 2B:
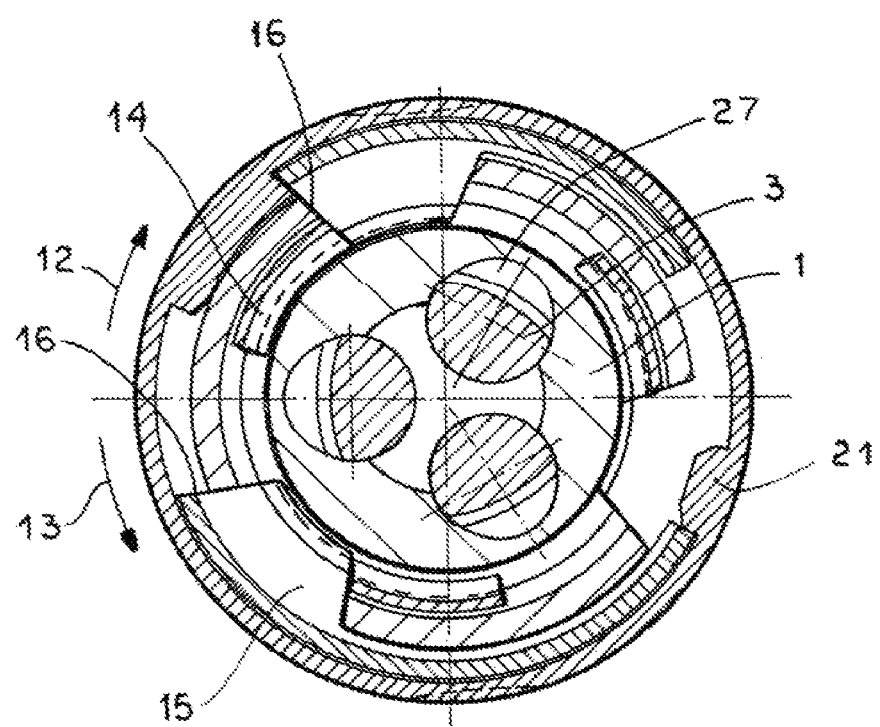
FIG. 2b shows section II-II of FIG. 1 in the tightened, unlocked position of the drill chuck.
Figure 2C:
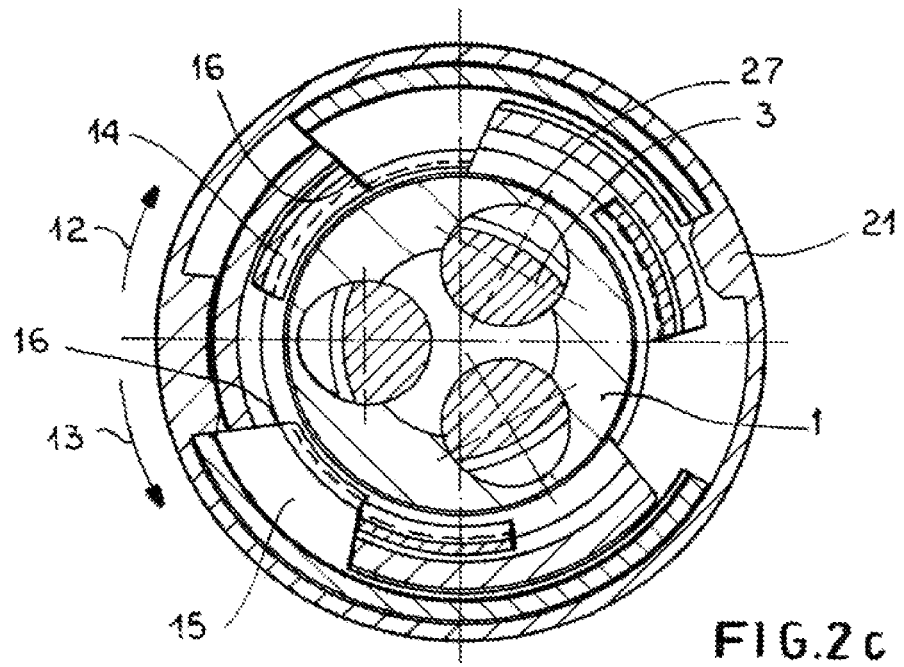
FIG. 2c shows section II-II of FIG. 1 in the tightened, locked position of the drill chuck.
Figure 3A:
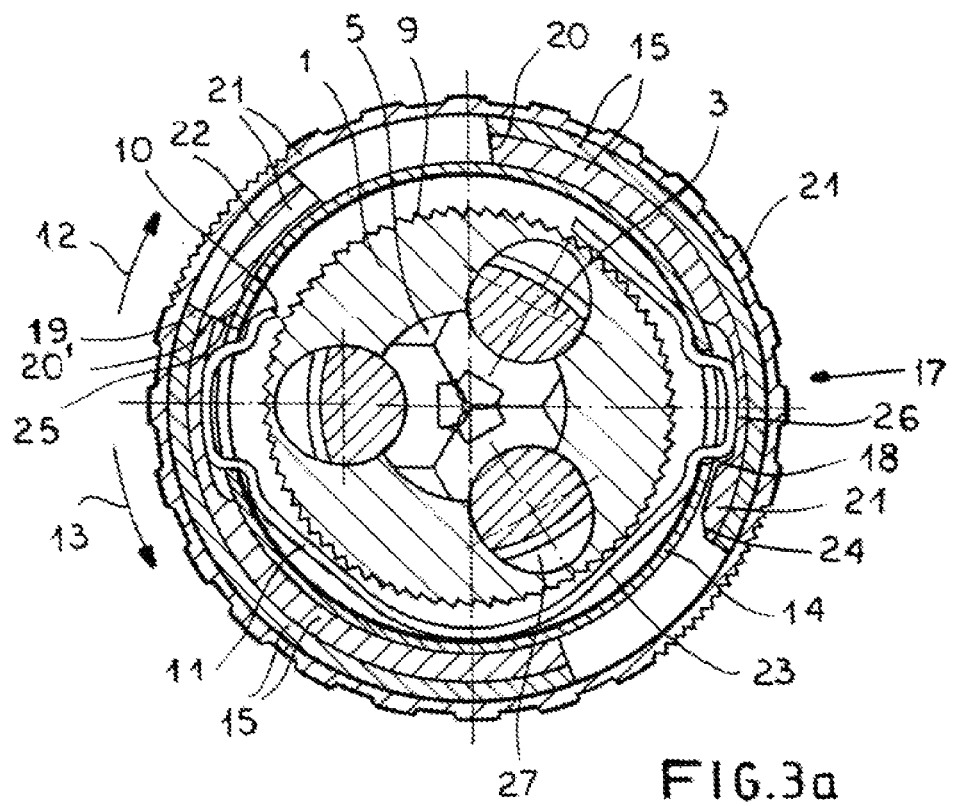
FIG. 3a shows section of FIG. 1 in the open, unlocked position of the drill chuck.

FIGS. 1, 2a and 3a show a drill chuck to be tightened manually in the open, unlocked position. In order to tighten the shaft of a tool, the tightening ring 15 is grasped and rotated in the direction 13 during which the abutments 16 change and intermediate sleeve 14 is entrained with the locking ring 6. At this time the second abutments 20 come to rest on the end stops 19 (FIG. 3b). The locking ring 21 can now be rotated as the user desires. As a result, the second abutments 20 and the end stops 19 change again so that the locking ring 21 is freed and actuation of the locking mechanism during opening is again possible, that is, the position of FIG. 3a is reached again on rotation of the tightening ring 15 in the opening direction 12.

In a similar manner, movement of the latch member 26 of latch mechanism 17 also takes place between the two latching positions 18 so that, starting from FIG. 3b the position shown in FIG. 3c is reached that shows the tightened position of the drill chuck when the jaws 3 rest on the tool shaft. An increase of tightening force is possible in an unchanged manner since rotation of the tightening ring 15 in the tightening direction 13 is not hindered.

Basically, this change between the release position and the locking position is also possible before the tightening process once maximal tightening force has been reached; however, this switching process is appropriately not carried out until after the desired tightening force has been achieved since otherwise the locking member 10 would have to proceed by degrees over the locking recesses 9 for the continued tightening, which also adversely affects the level of the maximally achievable tightening force that is therefore basically higher in the drill chucks shown in the drawings than in the previously known drill chucks, in which the locking mechanism must obligatorily also be actuated in the tightening process and thus produce certain frictional losses.

If the tool is tightened between the jaws 3, the user can actuate the locking mechanism by rotating the locking ring 21 in the same rotation direction 13 in which the tightening ring 15 had previously been rotated; however, this does not have to happen. If the user actuates the locking mechanism, the locking ring 21 moves relative to the second abutments 20 and 20' of the tightening ring 15 and allows the locking member 10 to engage into the locking recesses 9 of the chuck body 1 by actuation by the control edge 25 of the cam 22.

In order to open the drill chuck and change the tool, the user merely grasps the tightening ring 15 and rotates it in the direction of rotation opposed to the tightening direction 12. The user can do this independently of which configuration is present, that is, independently of whether the position shown in FIG. 3b, that is suited in particular for driving screws, was selected or whether the position shown in FIG. 3c was selected by the user. The user is therefore not forced to actuate the locking ring 21 first in order open the drill chuck because it is entrained by the tightening ring 15 when, starting from FIG. 3c the operating position shown in FIG. 3a is reached by rotating the tightening ring 15, during which the relative rotation of the tightening ring 15 with the locking ring 21 relative to the locking ring 6 makes unlocking possible. This operating position is also reached if the locking mechanism is not actuated, that is, the drill chuck is tightened but unlocked (FIG. 3b), since as a result of the limited rotatability of the tightening ring 15 relative to the locking ring 6 with intermediate sleeve 14 at first the second abutments 20 and 20' can change and then the continued opening of the chuck takes place.

The invention claimed is:

1. A drill chuck with a chuck body that can be connected to a drill spindle and in which jaws forming a seat between themselves for the drilling tool are arranged in guide grooves running at an angle to the chuck axis, the jaws engaging with a row of teeth for opening and closing the drill chuck into the screwthread of a threaded ring rotatably guided on the chuck body, furthermore with a locking mechanism for the threaded ring consisting of a coaxial annular array of locking recesses and of at least one locking member that is engaged in the locking position under the force of a locking spring in the locking recesses, the locking member and the locking recesses resting on each other via inclined flanks in such a manner that they block the threaded ring against rotation in the direction of rotation corresponding to the opening of the drill chuck but when the threaded ring is rotated in the opposite, direction of rotation, that is, the one corresponding to the closing of the drill chuck, they press the locking member against the force of the locking spring out of the locking recesses and thus allow it to slide from locking recess to locking recess, furthermore with a coaxial tightening ring that can rotate between first abutments in a limited manner opposite the threaded ring, and with a latch forming two latching positions for the tightening ring in the circumferential direction wherein a locking ring that can rotate with end stops between second abutments of the tightening ring in a limited manner is provided for shifting the locking member between the locking position and the release position corresponding to the position of the locking member disengaged from the locking recesses, that the second abutment, that is the front one in the direction of rotation corresponding to the opening of the drill chuck, rests in the locking position on the end stop, and that the latch is formed between the locking ring and the threaded ring.

2. The drill chuck according to claim 1 wherein the locking ring is rotatably supported on the tightening ring.

3. The drill chuck according to claim 2 wherein the locking ring and that the end stops are provided on a locking cam formed on the inner periphery of the locking ring.

4. The drill chuck according to claim 2 wherein the locking ring is guided radially inward relative to the tightening ring and extends through the latter in a ring window with a gripping cam that makes the end stops available.

5. The drill chuck according to claim 3 wherein a control edge is provided on the cam for controlling the locking member and that, when the locking ring is rotated relative to the tightening ring in its direction of rotation corresponding to the closing of the drill chuck, the locking member is moved out of the disengaged position into the engaged position and vice versa.

6. The drill chuck according to claim 1 wherein the locking member is rotationally fixed on an intermediate sleeve rotationally fixed to the threaded ring and is formed on a spring clip that also carries the latch member of the latch.

7. The drill chuck according to claim 6 wherein the locking ring carries on its radially inner surface a latch cam that separates the two latching positions of the latch.

8. The drill chuck according to claim 1 wherein the locking ring is arranged on an axially front end of the tightening ring.

9. The drill chuck according to claim 1 wherein the locking ring is arranged on an axially rear end of the chuck body.

10. A drill chuck comprising:
- a chuck body centered on a body axis, securable to a drill spindle and rotatable thereby about the axis, and formed with an axially forwardly open seat and with a plurality of guides open at the seat;
- respective jaws shiftable in the guides for gripping a tool or workpiece in the seat;
- a threaded ring rotatable on the chuck body about the axis and having a screwthread engaging the jaws for shifting same in the respective guides;
- a tightening sleeve rotatable on the threaded ring;
- first abutments between the threaded ring and the tightening sleeve limiting rotation of the tightening sleeve relative to the threaded ring to movement between a pair of end tightening-sleeve positions;
- a locking ring rotatable relative to the tightening sleeve and radially outwardly exposed axially adjacent the tightening sleeve, whereby the locking ring is manually actuatable from outside;
- second abutments between the locking ring and the tightening sleeve limiting rotation of the locking ring relative to the tightening sleeve to movement between a pair of end locking-ring positions;
- an annular array of teeth on one of the rings directed radially toward the other of the rings;
- a locking member on the other of the rings radially engageable in the teeth, the locking member and teeth having flanks oriented such that when the locking member is engaging the teeth the tightening ring cannot rotate relative to the chuck body in a loosening direction that radially spreads the teeth but the tightening ring can rotate relative to the chuck body in an opposite tightening direction; and
- a spring urging the locking member into radial engagement with the teeth, the locking ring in one of the end locking-ring positions lifting the locking member against a force of the spring out of engagement with the teeth and in the other of the end locking-ring positions freeing the locking member to engage under the force of the spring with the teeth.

* * * * *